Aug. 10, 1943.　　　G. A. FASOLD ET AL　　　2,326,723
ROOFING
Filed Dec. 18, 1940　　　3 Sheets-Sheet 1

INVENTORS
George Arthur Fasold
Harold W. Greider
BY Kenyon & Kenyon
ATTORNEYS.

Aug. 10, 1943.  G. A. FASOLD ET AL  2,326,723
ROOFING
Filed Dec. 18, 1940  3 Sheets-Sheet 2
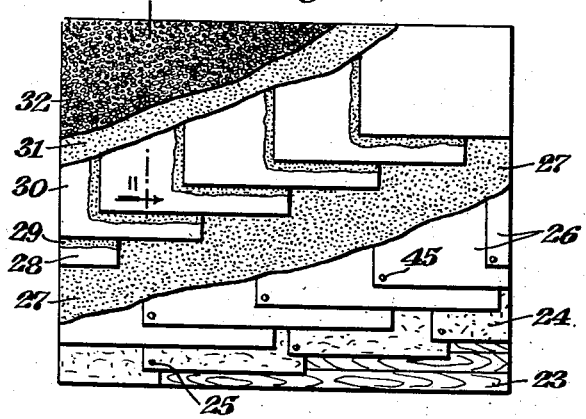
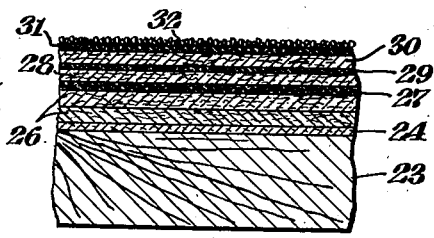
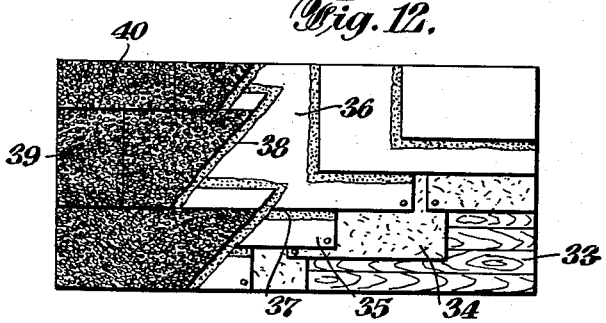
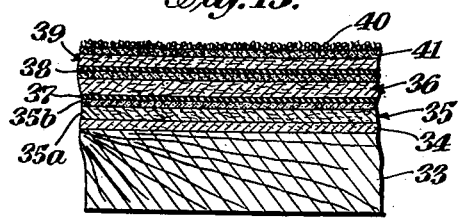

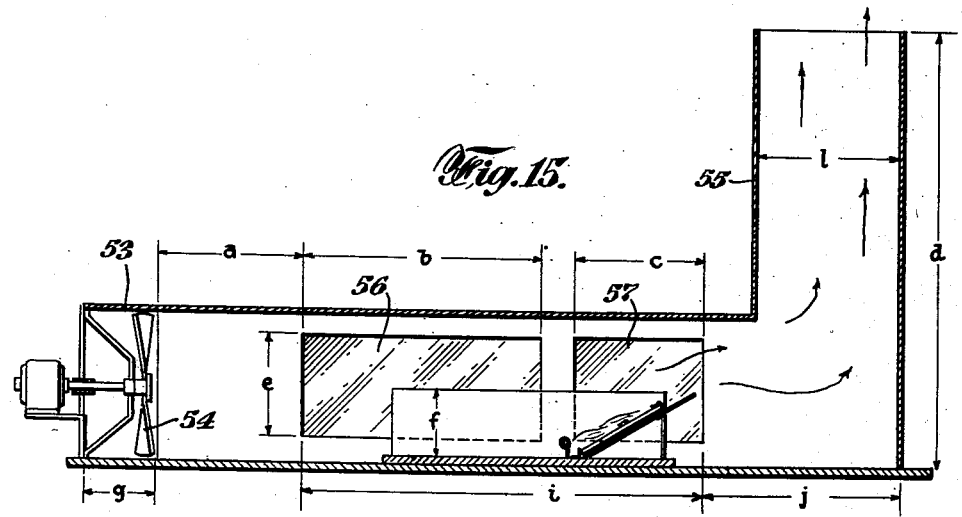
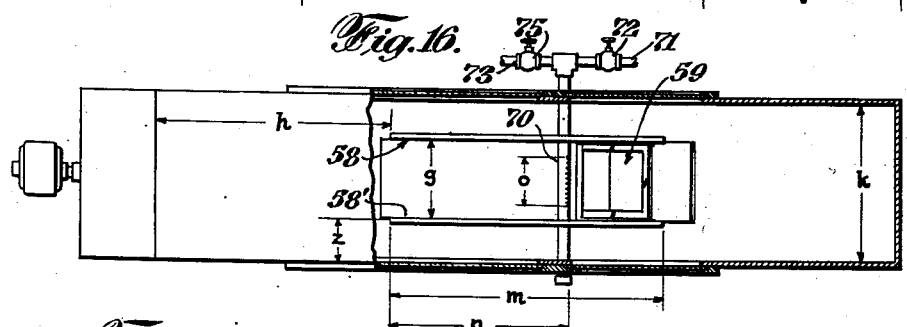
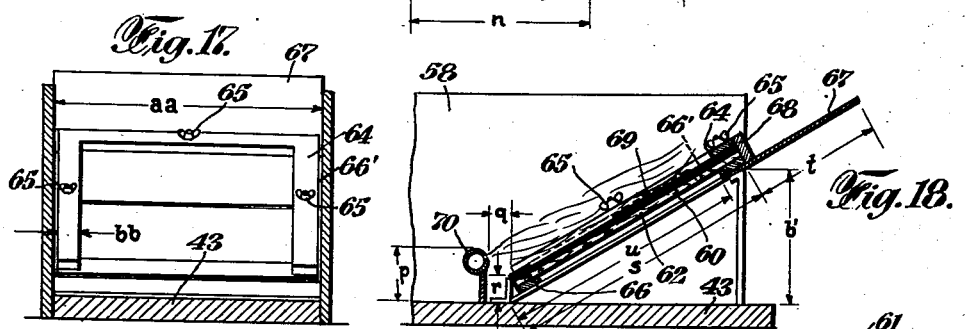
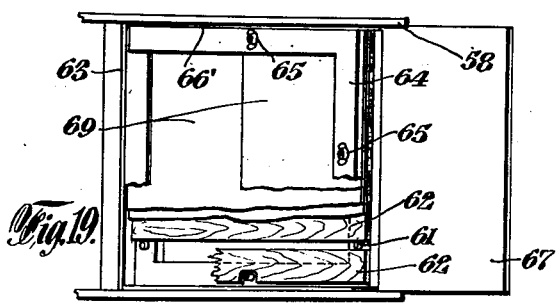
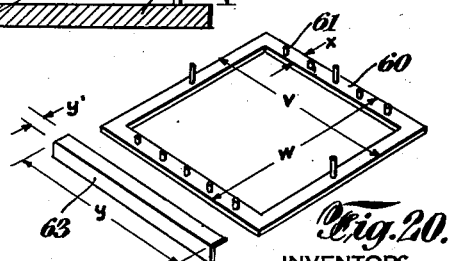

Patented Aug. 10, 1943

2,326,723

UNITED STATES PATENT OFFICE 2,326,723

ROOFING

George Arthur Fasold, Mount Healthy, and Harold W. Greider, Wyoming, Ohio, assignors to The Philip Carey Manufacturing Company, a corporation of Ohio Application December 18, 1940, Serial No. 370,636

19 Claims. (Cl. 154—51)

This invention relates to roofing and material for roofing. This invention relates particularly to roofing and roofing material comprising a bituminous waterproof coating. While reference has been made to "roofing" this term is used generally herein as referring to water and weather resistant coverings such as shingles (individual or strip singles), roll roofing, cap sheets, sidings, roof deck coverings made from such preformed material, built up roofings and the like.

Heretofore bituminous prepared roofing has been very extensively manufactured using as a base or foundation a fibrous web such as a sheet of roofing felt, impregnating the fibrous web with a bituminous material, and coating one or both surfaces of the impregnated web with a weather resistant bituminous coating material. The bituminous coating material frequently contains mineral filler material such as slate flour or powdered limestone. Usually there is applied to the surface intended to be exposed to the weather a suitable granular material, such as slate granules, or finely divided mineral surfacing material, such as talc or mica. Finely divided materials such as mica flakes, talc, silica dust or the like may be made adherent to the non-weather-exposed surface of the roofing to prevent sticking of the adjacent layers of the roofing material in the package.

Ordinary bituminous roofings such as roofing of the character above mentioned have limited fire retardant properties. This type of roofing is given a class "C" rating by the Underwriters' Laboratories, Inc., provided the roofing is made to certain specified standards as to material, construction, and demonstrated ability to pass the class "C" burning brand and flame exposure tests. We do not know of any bituminous prepared roofing or shingles made on a felt base of organic fiber, irrespective of the number of layers or plies that are applied to the roof deck that will successfully pass the class "B" or class "A" fire retardant tests of the Underwriters' Laboratories, Inc., which are reserved for roofing constructions able to withstand more severe fire exposure.

It is a purpose of this invention to improve upon roofing comprising a layer of thermoplastic material such as bituminous material so as to improve the fire resistance of the roofing. Thus, for example, we have found that a prepared roofing material which comprises an organic fiber felt base and a bituminous waterproofing coating can be made according to this invention at a cost comparable to the cost or ordinary prepared bituminous roofing material that is so highly fire retardant that a three layer covering on a combustible roof deck will satisfactorily withstand exposure to the class "A" fire retardant tests prescribed by the Underwriters' Laboratories, Inc., which tests will be referred to more fully below and which are the most severe fire retardant tests used by the Underwriters' Laboratories. We have found further that such roofing material embodying our invention when applied so as to provide two layers will successfully pass the class "B" fire retardant tests prescribed by the Underwriters' Laboratories, Inc.

The importance of fire resistant properties for roofing is self-evident. Certain roofings such as asbestos-cement shingles, slate and the like have high fire resistance but such roofings are very costly as compared with asphalt-felt roofings, and for this reason asphalt-felt roofings are very extensively used on all kinds of structures notwithstanding the limited fire protection that is afforded by this type of roofing. According to this invention asphalt-felt roofings can be made without substantial increase in cost which are comparable in fire retardant properties to relatively much more costly roofing constructions such as asbestos-cement shingles, slate, and the like. The highly fire resistant roofing of this invention is likewise important from the standpoint of national defense as affording an economical roofing that is resistant to incendiarism and spread of fires in populous communities and in military housing and manufacturing establishments.

Substantially all bituminous roofings comprise a strain resisting base or foundation sheet such as roofing felt which is coated with a bituminous coating that provides waterproofing and weather resistance. This invention has to do with coating material rather than the base sheet. While the base sheet might be made of noncombustible material, the non-combustibility of the base sheet does not solve the problem if the bituminous coating itself burns or tends to flow so as to spread the flame. According to the present invention the waterproofing coating is rendered highly fire resistant so that even when applied to a base sheet of combustible organic fibers, roofing can be made which has the high degree of fire resistance mentioned above.

Features of roofing embodying the present invention relate to the composition and characteristics of the coating composition which impart attributes that render the roofing highly fire resistant. One of these attributes is that the coating while comprising an essentially thermoplastic bituminous base also comprises a heat resistant finely divided material having surface characteristics such that as incorporated in the bituminous coating it is flow resistant when the bitumen in the coating becomes softened by heating to elevated temperatures at or approaching flame temperatures and provides a skeletal mat which remains coherent and persists in place so that the finely divided heat resistant material does not tend excessively to flow down an inclined roof deck, e. g. a roof deck having a 30 degree inclination to the horizontal, leaving underlying material such as a combustible organic felt base for the roofing exposed to the flame. Another attribute of the roofing is that the fire resistant coating when exposed to high temperatures approaching or at flame temperatures tends to result in a coherent mat-like mass which has high heat insulating properties and in preferred embodiments develops pores therein augmenting the heat insulating effectiveness so as to shield an underlying combustible roof deck from the heat of the flame. Another attribute of the fire resistant coating is that it is highly resistant to combustion so that if it tends to char upon exposure to flame the charring and consumption are very gradual and discontinue without substantial spreading as soon as the exposure to flame is discontinued. Other features of this invention relate to the disposition of the special coating material in strata in roof deck coverings and to the disposition, character and quantity of the finely divided heat resistant material in the coating material and in the roofing structure.

In addition to high fire resistance certain embodiments of the present invention have the further advantage of being highly resistant to blistering, namely the tendency of bubbles of vapor or gas to form in or under coating material under the influence of moisture and summer roof surface temperatures. Certain embodiments of this invention having not only fire retardant properties but also high resistance to blistering are described in detail in our pending application Serial Number 347,154 filed July 24, 1940, for Roofing and roofing material and the manufacture thereof and are likewise referred to more in detail hereinbelow. There are, however, certain embodiments of this invention which, while not necessarily possessing the high blister resistance of the roofings covered by our said application, nevertheless are comparable in blister resistance to ordinary bituminous roofings at present on the market and at the same time have such very high fire resistance as to constitute a major advance in the art. It may also be mentioned that some roofings which are covered by our said pending application and which have very high blister resistance do not necessarily have the improved fire resistance of the roofings described in the present application. In preferred practice roofing is made which embodies both improvements on the prior art, namely improved fire resistance coupled with improved blister resistance.

For purposes of affording a better understanding of the practice of this invention it will be described for purposes of exemplification in connection with a typical embodiment thereof. The complete roof deck covering in this embodiment, comprises preformed bituminous shingles composed of a strain resisting sheet of roofing felt, a top or weather surface coating of special bituminous coating composition, a surface layer of mineral granules, and finely divided dusting material adherent to a layer of special bituminous coating composition on the back of the felt base sheet. The shingles are laid in overlapping arrangement, e. g. over a roof deck, so that all parts of the roof deck are substantially covered by three thicknesses of the preformed shingles.

In the preformed bituminous shingles the base or foundation sheet is ordinary roofing felt made of vegetable and animal fibers e. g. roofing felt from organic fiber stock weighing about 10 pounds per 100 sq. ft. The felt is impregnated with a suitable impregnating material, e. g. a conventional bituminous roofing saturant having a softening point of about 100° F. to about 170° F. The base sheet as thus composed has little fire resistance and when exposed to fire is consumed quite readily.

The special waterproofing coating for the shingles is a bituminous composition comprising a finely divided heat resistant material having surface characteristics such that as incorporated in the bitumen of the coating it is flow resistant and provides a skeletal mat having high resistance to displacement when the coating is exposed to flame temperatures. The special waterproofing coating also has the property of developing pores therein when subjected to flame. The waterproofing coating therefore is of such character that if subjected to fire it provides a heat insulating mat that persists in place during the softening of the bitumen by exposure to the heat of the flame and that while the bitumen is being charred or consumed by the flame insulates the underlying roof deck from the heat of the flame.

A typical example of the special coating composition may be made as follows. The asphalt for the coating preferably is that obtained by air blowing a residual asphalt flux from the refining of Mid-Continent petroleum to a softening point, ring and ball method, of about 220° F. to about 240° F. In this bituminous waterproofing is admixed and uniformly distributed finely divided asbestos dust, constituting a minor proportion of the coating as a whole and preferably constituting at least about 35% by weight of the bituminous coating material, the bitumen preferably being the major proportion. In applying the coating to the felt base sheet such as now used in the ordinary manufacture of prepared roofing, it is applied by a coating operation so as to be about 40 pounds per 100 sq. ft. and thereby affords a substantial layer. In this layer the asbestos dust is uniformly distributed, the minute interstices or pores between the particles of the asbestos dust being filled with the bitumen. The asbestos dust in the bituminous coating has the property of being flow resistant when the bitumen in the coating is subjected to flame temperature and of providing a skeletal mat that resists displacement and that has heat insulating properties as above mentioned. The flow resistance is due to the surface characteristics of the particles of the asbestos dust and is believed to be due partly to the size and fibrous character of the asbestos dust particles and due partly to the specific adhesion between the asbestos particles and the bitumen which tends to stabilize the bitumen in contact with the surface of the asbestos dust particles even when the bitumen is heated to elevated temperatures approaching flame temperatures. In the coating it is important that the asbestos dust be disposed uniformly and continuously over the surface of the base sheet and that the coating material be applied in sufficient quantity so that the asbestos dust contained therein may provide a coherent and stable skeletal structure of substantial density and thickness that has adequate heat insulating properties when the coating is subjected to flame temperatures. The action of this coating material when subjected to flame temperatures will be described more in detail below.

In preparing the special coating material the asphalt is first reduced to a heat liquified condition and the asbestos dust is thoroughly mixed therewith. While the softening point of the asphalt is preferably about 220° F. to 240° F. the mixing is preferably carried out at a considerably higher temperature, e. g. about 400° F. to 500° F. inasmuch as the asbestos dust has the property in the amount used of elevating the softening point of the mixture. Due to the fact that the asbestos dust is finely divided and evenly distributed in the bituminous mass, the composition can be spread so that the asbestos dust will become disposed continuously and uniformly both in amount and distribution over the base sheet.

In the manufacture of shingles for use in a fire resistant roof deck covering according to this invention any suitable machine for making prepared roofing may be employed, for impregnating roofing felt with a bituminous saturant and coating it with the special bituminous coating. The method and apparatus disclosed in our Patents Nos. 2,105,531 and 2,159,587 may be used and when the product is to have maximum blister resistance and durability as well as maximum improvement in fire resistance the method and apparatus disclosed in these patents are preferably employed. After the felt has been thoroughly impregnated with the bituminous saturant, as by passing it through a bath of the saturant, that is maintained at a temperature of about 350° F. to 450° F., the special coating material is applied at a temperature of about 390° F. to 450° F. by a coating operation so as to become uniformly distributed to the desired thickness. Before application of the bituminous coating it should be thoroughly mixed and should be applied in a thoroughly mixed condition so that as applied the finely divided asbestos is very uniformly distributed in the bitumen. A suitable agitator in the reservoir for the mixed coating composition can be used for this purpose. Moreover we have found that the mixing of the finely divided asbestos with the heat liquified bitumen can be greatly facilitated by preheating the asbestos at least to about 390° F. before it is mixed with the bitumen. Preferably the finely divided asbestos is heated to a temperature above the temperature at which the heat liquified bitumen is maintained so that during mixing the bitumen is brought up to a desirably high mixing temperature due to the heat of the filler. For example, we have found it to be desirable to maintain bitumen in storage at about 400° F. and to preheat the finely divided asbestos to about 500° F. When the bitumen is taken from the reservoir to the mixer it is mixed with the heated asbestos which raises the temperature of the mixture to about 425° F. which is suitable for the mixing step. The mixed material is then taken to the reservoir which supplies the coater and in which the material is agitated to maintain homogeneous distribution of the asbestos until immediately prior to the coating step. By following this preferred procedure the bitumen can be handled and mixed without local overheating and the stiffening effect of the finely divided asbestos interferes to a minimum extent with the mixing operations. Moreover, this procedure facilitates the application of the coating composition in a very uniform layer on the felt and in a condition such that the finely divided material will become distributed continuously and uniformly both in amount and distribution over the felt. The foregoing preferred procedure is likewise preferable when finely divided heat resistant materials other than finely divided asbestos are used in the coating composition. Before the roofing is cooled conventional surfacing material such as slate granules can be applied to the surface for weather exposure and these granules are partially embedded in the coating composition. The granular surfacing material is preferably non-combustible. On the opposite side of the roofing material there may be applied a thin coating of bituminous coating material, e. g. having a softening point of about 200° F. to 240° F., so as to weigh about 2 pounds per 100 sq. ft. and a finely divided dusting material such as talc or mica dust or similar material may be applied and partially embedded in the coating. Preferebly, for maximum fire resistance, the back coating should be special coating composition embodying our invention as applied to the top or weather side of the roofing. If desired, to increase insulating efficiency, granular cork could be applied in place of the talc or mica dust. Because of the high temperatures employed in applying the special coating material it is usually desirable to provide somewhat more cooling means than are customarily employed for cooling the roofing so that the machine may be operated at normal speed and so that the finished roofing will emerge at a temperature which is not excessively high and at which cutting into shingles and packing in the regular way are permitted.

The roofing thus prepared, e. g. in the form of prepared shingles (individual or strip) weighs about 105 pounds per 100 sq. ft. Of this weight about 35% is in the form of mineral granules adherent to one side and finely divided dusting material or other suitable material adherent to the other side, the balance of the roofing being the felt, the bituminous impregnating material and the bituminous coating material.

When reference is made herein to a bituminous material, or a bituminous coating, or a bituminous layer, reference is made to a material or coating or layer comprising bitumen either with or without a filler. The term "bitumen" alone is used herein in referring to asphalt, pitch, tar and the like, which has not been mixed with filler material.

The preformed roofing can be made up into a suitable roofing structure, description of typical roofing structures being facilitated by reference to the accompanying drawings, wherein Fig. 1 is a plan view of prepared roofing embodying our invention in the form of an individual shingle of simple rectangular shape;

Fig. 10 is a plan view of a typical built-up roof embodying our invention, with parts of the different layers broken away;

Fig. 11 is a sectional elevation on an enlarged scale of a portion of the built-up roof shown in Fig. 10 taken on the line 11—11;

Fig. 12 is a plan view of a special type of built-up roof embodying our invention in which is employed a prefabricated granular surfaced cap sheet as the weather-exposed surface layer, parts of the different layers being broken away;

Fig. 13 is a sectional elevation on an enlarged scale of a portion of the built-up roof shown in Fig. 12;

Fig. 14 is a fragmentary sectional elevation of precoated felt embodying our invention used in fabricating the built-up roof shown in Figs. 12 and 13;

Fig. 15 is a side elevation partly in section of a fire testing device for testing roofing material;

Fig. 16 is a plan view partly in section of the fire testing device;

Fig. 17 is a front elevation of a test panel assembly used in the fire testing device;

Fig. 18 is a side sectional elevation of the fire test panel assembly;

Fig. 19 is a plan view of the fire test panel assembly with parts thereof broken away; and Fig. 20 is a perspective view of the frame and guard plate used in the fire test panel assembly.

Figure 1:

The prepared roofing material may be cut into individual shingles 10 shown in Fig. 1. Preferably the roofing material is cut into individual strip shingles 10 having the shape shown in Fig. 2 or into shingles 11 of the type shown in Fig. 3 for reasons which will be explained below. Of course, shingles or the like of other shapes may also be used. In cross section the prepared roofing material appears as in Fig. 4 and comprises a base or foundation sheet 13 of bitumen impregnated roofing felt. Overlying the roofing felt is the coating 14 of special coating material having adherent to the surface thereof and partially embedded therein the slate granules 12. Adherent to the back of the roofing material is a layer 15 of the special bituminous coating material in which is embedded finely divided dusting material 48. Ordinarily some bituminous coating material and dusting material is employed on the back of the roofing material, but these materials are not essential and are sometimes omitted particularly when the roofing material is to be used in built-up roofing.

Figure 5:
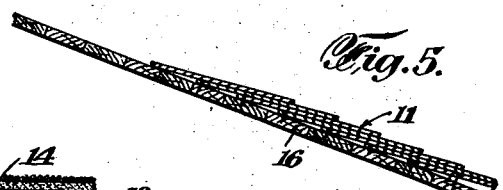
Fig. 5 is a sectional elevation of an inclined shingle roof embodying our invention without showing the component layers of the individual shingles.

In Fig. 5 is shown a typical roofing structure in place on a roof deck comprising boards 16 which serve as a support for the shingles, e. g. strip shingles 11 or individual shingles 10. The individual shingles may be 16 inches long overall and laid with a 5 inch exposure thereby affording triple coverage over all parts of the roof deck except for a portion of the spaces between adjacent shingles in each course. The component parts of the individual shingles appear in detail in the enlarged fragmentary view shown in Fig. 6.

A roofing structure of the character in the example above described has extremely high fire resistance. Thus a roofing structure such as that shown in Fig. 5, namely comprising three thicknesses of preformed roofing, will withstand the class "A" fire retardant tests as prescribed by Underwriters' Laboratories, Inc., in their published instructions. These tests are the burning brand test, the flame exposure test and the spread of flame test. In making the class "A" burning brand test the roofing is installed on a roof deck 3⅓ feet wide by 4⅓ feet long having approximately a 30° incline (5 inches per foot) and a large actively burning brand (weighing about 4 pounds and consisting of a three layer grid of 36 dry wood strips 12" x ¾" x ¾") is placed thereon and fanned by a twelve-mile per hour wind so that the brand burns fiercely and with almost a white heat at the interior of the brand for about one-half hour or more. If the brand burns out without igniting the combustible roof deck (made of 8" white pine boards, finished three sides, spaced about ¼ inch apart) the roofing passes the test.

In the class "A" flame exposure test a deck similar to the deck used in the burning brand test is covered with roofing to be tested and is subjected to a flame produced by a gas burner located below the lower margin of the deck. The flame impinges upon an incombustible apron extending downwardly from the lower margin of the test deck and mushrooms up around the lower margin of the deck and under the influence of a 12 mile per hour wind bathes substantially the full length of the upper surface of the deck covering. The gas flame is applied for periods of two minutes with intervals of two minutes between applications, and if the test is continued for a period of one hour without igniting the combustible roof deck, the roofing is regarded as passing the test.

The other class "A" fire retardant test is the spread of flame test. This test is carried out under conditions which are the same as those used in the flame exposure test except that the roof deck is three times as long (13 feet) and except that the flame is applied continuously. The flame bathes about three to three and one-half feet of the lower portion of the upper surface of the covering that is applied to the deck and the tendency of any flame resulting from combustion of material in the roof deck covering to spread beyond the area of direct exposure to flame is noted. As long as the flame continues to spread the test is continued until the entire deck is thoroughly ignited. On the other hand if the flame spreads somewhat and then discontinues spreading or recedes, so that it is evident that the flame will not spread further the test is discontinued. If the flame spreads up the deck to a point not more than about six feet from the lower edge of the deck, the roofing is regarded as passing the class "A" flame spread test.

As mentioned above we do not know of any prepared bituminous roofing made on a felt base of organic fibers which, irrespective of the weight of the roofing material or the number of layers or plies that are applied to the roof deck, will successfully pass either the class "A" fire retardant tests or will even pass the class "B" fire retardant tests. The class "B" tests are generally similar to the class "A" tests except that for example in the burning brand test the brand is much smaller (consisting of a three layer grid of 18 dry wood strips ¾" x ¾" x 6" and therefore only one-fourth the size of the class "A" brand) and burns out after a much shorter time interval. In the class "B" flame exposure test, the test is only carried on for one-half hour and in the class "B" flame spread test the flame is permitted to spread up the roofing to a point not more than 8 ft. from the lower edge of the deck.

When ordinary bituminous prepared roofing is subjected to the class "A" burning brand test, for example, the coating material when exposed to the brand melts and as a mass starts running down the surface of the roof. The melted asphalt also starts to burn and the burning asphalt in running down the roof spreads the fire. The coating material that runs down the roof leaves the bituminous organic felt base exposed which, being readily combustible, starts burning so that the fire goes through the roofing quite readily and ignites the combustible roof deck in a relatively short time.

Figure 7:
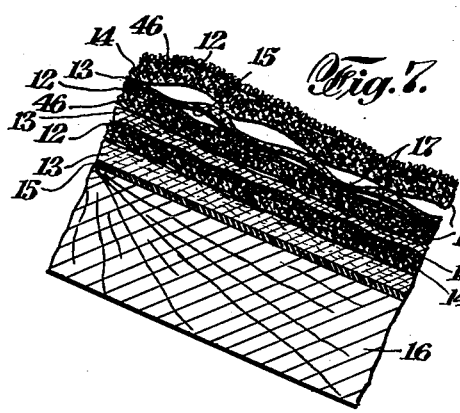
Fig. 7 is similar to Fig. 6 except that the roofing is illustrated as it appears after exposure to flame temperatures.
Figure 6:
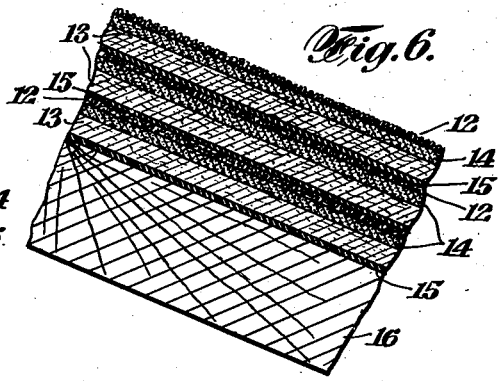
Fig. 6 is an enlarged sectional elevational view of a portion of the roof shown in Fig. 5, as installed.

By way of contrast our improved roofing made as above described by way of example behaves very differently when subjected to the same burning brand test. The behavior of the roofing material as applied to a roof deck in three layers, e. g. as shown in Figs. 5 and 6, is indicated roughly in Fig. 7. During the exposure to the flame the finely divided heat resistant material (asbestos dust), due to its surface characteristics, provides a skeletal mat in the special coating 14 and does not flow down the roof and even though the bitumen of the special coating becomes very greatly softened the skeletal mat persists and thereby protects the combustible material underneath. Moreover in the softened special coating material small bubbles 46 form which expand the coating material somewhat. During the exposure to flame much of the bituminous material carbonizes but the skeletal mat of asbestos dust remains as a firm coherent ash having pronounced heat insulation efficiency distributed substantially uniformly over the roof deck. In the roof structure as a whole as illustrated in Fig. 7 the upper layer of special coating material has become expanded and has become somewhat irregular but the asbestos dust has remained as a porous coherent carbonaceous ash that acts as a protective barrier against the flame. The layer of felt 13 may be carbonized and to a considerable degree may have disappeared leaving air pockets 17 together with some residual carbonized material. The intermediate layer 14 of special coating material is also expanded, the mat of asbestos dust remaining in place. The intermediate layer of felt is charred, but is better preserved than the uppermost layer of felt. The bottom layer of special coating material is less severely carbonized than the upper layer and likewise is considerably expanded. The bottom layer of felt is fairly well preserved and the underlying board 16, if charred at all, has not become ignited. The backing layers 15, being of the special coating composition, likewise augment the heat insulating effect of the roof deck covering and decrease the tendency of the bitumen contained therein to flow and to become ignited. It usually takes the burning brand used in making the Underwriters' class "A" burning brand test about 30 to 45 minutes to burn out. During this time the upper surface of the uppermost layer 14 may become red hot but the heat insulation effect of the carbonized residues of the layer 14 (and to lesser degree of the thinner layers 15) is so great that the board 16 does not become ignited and in some cases does not even appear scorched. During the test the effect of the flame on the roofing is confined to the area beneath and closely adjacent to the position of the burning brand and when the brand burns out all charring of the roofing soon ceases and the roofing cools down. When the roofing is preformed with cork granules on the back the cork granules have the property of enhancing the initial porosity of the roofing structure and the initial heat insulation effectiveness of the roofing so that while the cork granules may become consumed during flame exposure they augment the fire resistance of the roofing as a whole. It is not essential, however, that the cork granules be employed. The behavior of the roofing hereinabove described by way of example under the class "A" flame exposure test is generally similar to that above described in connection with the class "A" burning brand test. Such roofing also passes the class "A" flame spread test.

The resistance of the skeletal mat to displacement while the coating material is exposed to flame is due to the surface characteristics of the particles comprised in the asbestos dust. From one aspect the external shape of the particles of the asbestos dust is believed to contribute to the flow resistance of the particles comprised in the coating, inasmuch as while the particles are small they are nevertheless fibrous and tend to form a stable mat for this reason. From another aspect it is believed that the asbestos has the property of stabilizing bituminous material in contact with the surface thereof by an action in the nature of specific adhesion or adsorption and that the stabilization of films of bitumen on the surface of the small particles imparts a matting tendency such that the particles tend to form a stable skeletal mat when the bitumen in the coating is liquified by exposure to high temperatures. In this connection particle size is regarded as significant inasmuch as the total surface exercising a stabilizing action is much larger when the particle size is small than when the asbetos is in the form of fibers of considerable length, but excessive subdivision is not regarded as desirable inasmuch as asbestos particles of appreciable size (even though small) tend to form a skeletal structure of greater stability. These characteristics are also instrumental in affording a coherence that resists the development of gaps in the coating through which the flame may penetrate during the progress of the test. The expanding of the coating material and development of pores therein are due primarily to the fact that asbestos dust is selected which contains a substantial amount of chemically combined water which under the heat of the flame, becomes liberated forming water vapor which expands the bituminous coating material.

While the roofing above described has remarkable fire resistant properties it is also important that it possess those attributes which are necessary in a bituminous roofing that can be made and sold commercially. One of these attributes is that the roofing can be made on conventional roofing machines and that the special coating can be applied merely by the conventional roofing coating operation. It is of great practical importance that the special coating composition comprises the asbestos which does not interfere with the spreading of the special coating composition uniformly on the felt with the asbestos distributed as a uniform mat-like mass therein. If coarse or long fibers were used the fibers would tend to form clots and be dragged along locally during the coating operation so that parts of the felt base sheet would be inadequately protected and so that the surface of the roofing would become too irregular to be sold commercially.

Another requirement of a commercial bituminous roofing is that it be sufficiently pliable at ordinary temperatures to resist tendency of the waterproofing coating to crack. The roofing above described, while resistant to flowing at flame temperatures, remains highly pliable at ordinary temperatures. Thus the above described roofing (e. g. a preformed shingle) can be bent 180° in 2 seconds around a 4 centimeter diameter mandrel with the fire retardant coating on the outside without cracking the coating through to the felt base, the test being made at 77° F. While the roofing is highly pliable it has the advantage of being somewhat stiffer at normal temperatures than ordinary asphalt roofing of similar weight. While it is possible to achieve high pliability at normal temperatures in the practice of this invention, one can achieve the fire resistant advantages of this invention in roofing which has less pliability at normal temperatures than the pliability of the roofing above described but which nevertheless has sufficient pliability at normal temperatures for most commercial purposes. It is desirable that an asphalt roofing having a bituminous waterproofing coating be sufficiently pliable to be bent 180° in 2 seconds around a mandrel of 10 centimeters diameter at 77° F. with the coating on the outside without cracking the coating through to the base on which it is applied and any such coating or layer is referred to herein as "pliable" at ordinary temperatures.

Any roofing must of course be weather resistant and waterproof. The roofing above described is extremely weather resistant and has the added advantage of being highly resistant to blistering.

The new roofing likewise was found not excessively brittle at lower temperatures such as 32° F. and exhibited satisfactory strength under such well known tests as the Mullen bursting test and the conventional tensile strength tests. In fact the specimen above described exhibited considerable improvement as compared with ordinary asphalt roofings. Moreover, the slate granules adhered more tenaciously to the special coating composition under weathering conditions than to the waterproofing coating used on ordinary asphalt roofings.

It is believed to be apparent from the foregoing that in the practice of this invention a roofing can be produced not only that has remarkable fire resistant properties but also that has the other requisites of an asphalt roofing, namely economy of manufacture, weather resistance, pliability and strength. Moreover, in certain embodiments of this invention roofing can be made that is highly resistant to blistering.

Figure 2:
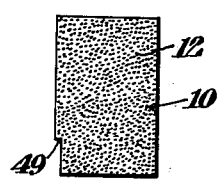
Fig. 2 is a plan view of prepared roofing embodying our invention in the form of an individual shingle of a preferred shape.
Figure 3:
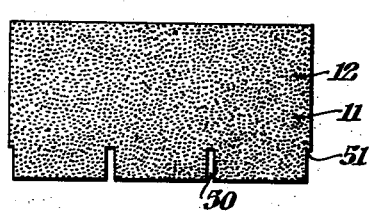
Fig. 3 is a plan view of prepared roofing embodying our invention in the form of a shingle strip.
Figure 4:
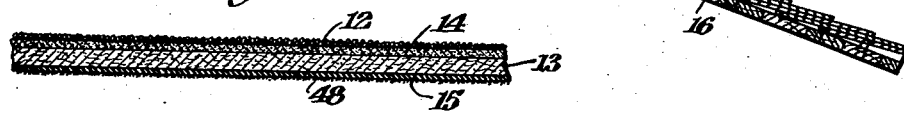
Fig. 4 is a fragmentary cross sectional view on an enlarged scale of prepared roofing embodying our invention.

In a fire resistant roof structure the strip shingle is preferred to the individual shingle. Referring to Fig. 3 it is to be noted that the recesses or slots 50 only extend partially into the body of the shingle and that at the ends of the strips notches 51 form similar recesses between abutting pieces of the strip shingle. When the shingles are installed the recesses do not extend upwardly underneath overlying shingle portions. With individual shingles of simple rectangular shape the gaps or spaces between them form apertures that extend upwardly underneath overlying shingle portions through which heat of the flame and hot combustion gases can pass. This is prevented when the strip shingle construction is employed. It can also be prevented when individual shingles are used, if the individual shingles are shaped so that the space between adjoining shingles does not extend back substantially beyond the weather exposed portion of the shingles as installed. The individual shingle shown in Fig. 2 is exemplary of an individual shingle of this type. The shingle shown in Fig. 2 is similar to that shown in Fig. 1 except that it includes a notch 49 that extends rearwardly from the forward margin of the shingle by a distance that is equal to the length of the normal weather exposed portion of the shingle. Individual shingles of the type shown in Fig. 2, for example, can be laid with substantially all of the side margins of the non-weather exposed portions of the shingles closely abutting thereby preventing the occurrence of apertures extending a substantial distance underneath overlying shingle portions. In the preferred embodiment of our invention we prefer that width of the spaces between the exposed tabs of the shingles shall not be greater than one-half inch.

Figure 8:
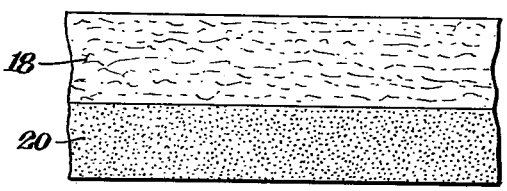
Fig. 8 is a plan view of one form of prepared sheet roofing embodying our invention adapted to be installed in roll form.
Figure 9:
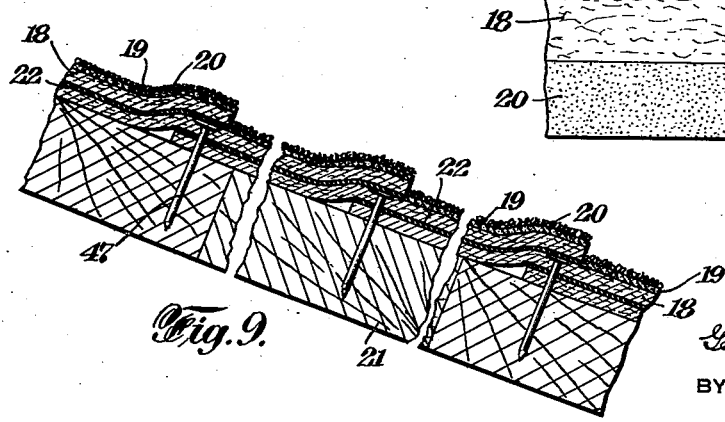
Fig. 9 is a sectional elevation of a portion of an inclined roof deck with the roofing material of Fig. 8 installed thereon, the roofing material being shown with exaggerated thickness for clarity.

The preformed roofing can of course be laid with a greater proportion thereof exposed and so that the roof covering will be composed of two layers instead of three. Such a roofing is illustrated in Figs. 8 and 9. In Fig. 9 the roofing material is shown as installed on a roof deck with the thickness of the courses exaggerated for clarity. The preformed roofing material consists of a foundation sheet 18 of bituminized roofing material, coated over a part of its width with a coating 19 of the special coating composition. This material may be made up in rolls about 36 inches wide for example with slightly less than half of the width of the asphalt saturated foundation sheet 18, e. g. 17 inches of the width, coated with the special coating 19 and covered with the mineral granules 20, e. g. slate granules. This type of roofing may be laid on boards 21 of a roof deck using suitable securing means such as nails 47, the slate covered portion being exposed and the balance underlying an adjoining sheet as shown in Fig. 9. Where the preformed sheets overlap they are caused to adhere to each other by a bituminous adhesive material 22 which, preferably, is the special coating composition embodying our invention. The roofing structure above described employing the special coating composition embodying our invention as the bituminous adhesive 22, will successfully withstand the Underwriters' class "B" test.

Of course preformed shingles (either individual or strip shingles) may also be laid in two courses instead of three and when roofing material of the character hereinabove described by way of example is made up into such a double-coverage roof deck covering, the roofing will likewise pass the class "B" tests prescribed by Underwriters' Laboratories, Inc.

In the special coating above described the asbestos dust used is characterized by being of very short fiber lengths and small particle size, namely about 85% by weight passing a 48 mesh standard testing sieve and about 65% by weight passing a 100 mesh sieve. Such asbestos dust is a waste product of asbestos mines and is generally discarded in dumps at the mines while the usual asbestos fibers of commerce are recovered and sold. While finely divided asbestos should be used, it is possible to get the material excessively fine. Thus if asbestos dust is screened and only the residue is used, which residue all passes a 200 mesh testing sieve, the fire retardant characteristics are reduced. This is believed to be due to the fact that such extremely fine material lacks the capacity to form a skeletal nut-like mass in the coating which is sufficiently stable and resistant to displacement when the coating composition is subjected to flame temperatures. For this reason when asbestos is used, the coating composition should preferably contain at least about 10% of asbestos that is retained on a 100 mesh testing sieve.

On the other hand the asbestos that is used should not comprise an excessive amount of fiber having considerable length. The grades of asbestos classified as "fiber" according to the Quebec Asbestos Producers Association, are unsuitable for use in our invention because their average fiber length is excessive. Such grades of asbestos which contain fibers of very substantial length (and which are desirable for this reason for a number of other commercial purposes such as reinforcing insulations, manufacture of asbestos paper, etc.) do not lend themselves to the improved roofing of this invention. The fibers tend to become entangled in clumps or clots which result in non-uniform distribution of the asbestos in the coating composition and which render it substantially impossible in a manufacturing operation to apply the coating material without producing a product of non-uniform thickness and having an unsatisfactorily irregular surface texture and therefore commercially unacceptable. These irregularities likewise impair the fire resistance of the roofing inasmuch as some parts of the underlying felt base sheet are inadequately protected from the flame because the formation of fiber clumps destroys the continuity of the skeletal mat and prevents forming a skeletal mat of uniform, adequate thickness and reduces the effective surface for stabilizing bitumen in contact therewith. Moreover the long asbestos fibers do not form a mat that is as dense as when the asbestos dust is employed and permit the radiant heat of a flame to pass therethrough more readily. An asphalt coating material containing long asbestos fibers, by reason of its non-uniform thickness and irregular surface texture likewise inevitably impairs the weather resistance and durability of the roofing on exposure. For these reasons the coating material preferably should not contain more than about 10% by weight of the total asbestos content that is retained on a 14 mesh testing sieve. Preferably the asbestos that is used is that which will pass a 14 mesh testing sieve and a substantial proportion of which will be retained on a 150 mesh testing sieve, a major proportion being retained on a 200 mesh testing sieve. A somewhat wider range is, however, permissible namely that passing a 10 mesh testing sieve with a major proportion retained on a 200 mesh testing sieve. Such finely divided asbestos has the capacity to produce a coherent mat-like structure that is uniform and continuous and that has pronounced resistance to displacement when the coating is subjected to flame temperatures and provides a coherent mat that is uniform in structure and thickness and constitutes an effective barrier to the flame and has high heat insulating value in protecting a combustible roof deck from the heat of a flame. Moreover, by utilizing asbestos of fine particle size the retention of a multiplicity of small pores produced by expelled combined water of the asbestos is promoted and the heat insulating value of the composition thereby enhanced.

When it is stated herein or in the claims that the bituminous composition contains a minimum percentage of fiber or other filler which passes a 14-mesh (or a 10-mesh) testing sieve and a major proportion (over 50%) by weight of which is retained on a 200-mesh testing sieve, reference is made to the defined filler as being of particular effectiveness for use according to this invention but without necessarily excluding the presence of additional fibrous or other filler that is outside of this definition. Thus, a bituminous composition containing, for example, 65% by weight of asphalt and 35% by weight of asbestos dust, all of which passes a 14-mesh testing sieve and substantially 50–51% of which is retained on a 200-mesh testing sieve, is to be understood as containing 35% by weight of filler which passes a 14-mesh (or a 10-mesh) testing sieve and a major proportion (over 50%) of which is retained on a 200-mesh testing sieve, and any bituminous composition is also to be understood as containing this same percentage of such effective filler material, if, in addition to this percentage of effective filler material, there may be present some additional filler material that passes a 200-mesh testing sieve or some coarse material that is retained on a 14-mesh (or a 10-mesh) testing sieve. More concretely, and merely by way of example, if there is available a supply of asbestos dust all of which passes a 14-mesh testing sieve and containing 50–51% by weight of particles retained on a 200-mesh testing sieve, and a bituminous composition is formulated using 35% by weight of the composition of this asbestos dust, the resulting composition obviously contains 35% by weight of finely-divided mineral filler passing a 14-mesh testing sieve and a major proportion (over 50%) by weight of which is retained on a 200-mesh testing sieve regardless of the balance of the composition which may consist entirely of asphalt or may consist of asphalt together with some other filler such as asbestos retained on a 14-mesh testing sieve and constituting, say, 3% by weight of the composition, and/or such as asbestos powder, kaolin or the like all passing a 200-mesh testing sieve and constituting, say, 3% by weight of the composition. In a composition of the proportions just mentioned, the 3% by weight of asbestos that is retained on a 14-mesh testing sieve and the 3% by weight of additional filler all passing a 200-mesh testing sieve merely constitute surplus filler in the composition which, as aforesaid, contains 35% by weight of filler which passes a 14-mesh testing sieve and a major proportion (over 50%) by weight of which is retained on a 200-mesh testing sieve. The foregoing applies to other fillers and filler mixtures and to percentages of filler content other than 35% that are mentioned herein.

The amount of asbestos that is used of the fineness of sub-division above mentioned ordinarily is greater than 25% and less than 50% by weight of the coating composition, and preferably is about 30% to 45% by weight. The bitumen should ordinarily constitute a major proportion of the coating composition although in some cases sufficient waterproofing properties and pliability can be attained when the bitumen content of the coating composition is only about 45% by weight. Conversely the total amount of mineral filler including the asbestos should not exceed 55% by weight of the coating composition. The asbestos that is used is preferably of graded size. Thus it is preferable that the asbestos contain about 20% by weight of material retained on a 48 mesh sieve and at least about 40% by weight retained on a 150 mesh sieve.

Of the filler materials that may be used in the practice of this invention Chrysotile asbestos shorts or dust are preferred. In the first place this material has the capacity to form a stable and coherent skeletal mat. In the second place the Chrysotile asbestos contains about 12% to about 15% by weight of water of constitution liberatable at temperatures adjacent flame temperatures which by forming pores in the coating composition when the composition is subjected to flame temperatures greatly increase the thermal insulating effect of the composition when subjected to flame. Asbestos fibers of other types when the fineness of size grading above specified and which contain water of constitution liberatable at flame temperatures are preferable for use in our invention, for the same reason. Another fibrous mineral, Canadian picrolite, also has these properties, namely, contains water of constitution in an amount corresponding to that contained in Chrysotile asbestos fiber, and is likewise regarded as coming within the meaning of the term "asbestos" as used herein.

In addition to asbestos in finely divided form containing water of constitution there are other finely divided, heat resistant fibrous mineral materials which when incorporated in a bituminous waterproofing have the capacity to form therein a skeletal mat having sufficient structural stability to resist displacement and rupture when the bituminous composition is subjected to flame temperatures. Examples of such materials are finely comminuted mineral wool, e. g. rock wool, and finely comminuted glass fibers. These materials should be used in approximately the same condition of subdivision as the asbestos shorts and dust for the reasons given above. These materials if used by themselves are quite effective due to the fact that they form a stable and coherent mat that resists displacement when the coating is subjected to flame temperatures and thereby protect the underlying felt and roof deck from the heat of the flame even when the roofing is on an inclined roof deck. However, since these materials do not contain water of constitution or other gas or vapor liberatable at or adjacent flame temperatures they do not have the capacity to expand the coating material when subjected to flame by the development of pores to the extent that asbestos does and therefore do not result in a residue that has as high heat insulating value as a coating composition utilizing asbestos shorts or dust. Other fibrous minerals in the asbestos group which have very low liberatable combined water content and which fall in the same category are crocidolite, amosite, anthophyllite, tremolite and actinolite.

The effectiveness of materials such as finely comminuted mineral wool or rock wool or finely comminuted glass fibers can be increased by combining these materials with a finely divided heat resistant non-fibrous material adapted upon being subjected to flame temperatures to liberate a gas or vapor so as to expand the coating composition and augment its heat insulating effect. A preferred material of this sort is pulverized hydrated (indurated) Portland cement. Pulverized hydrated Portland cement contains about 15% to about 20% by weight of water of constitution which is liberated somewhat below flame temperatures, namely at temperatures above about 800° F. This material should preferably be pulverized sufficiently to pass a 48 mesh testing sieve inasmuch as particles which do not pass a 14 mesh sieve detract from the uniformity of thickness of the coating and prevent formation of an effective skeletal mat. Hydrated Portland cement may be used in an amount sufficient to substantially expand the coating composition when the composition is exposed to flame. For example 10% to 30% by weight of this material will increase the effectiveness of a composition containing pulverized rock wool or pulverized glass fibers. In a specific example the coating composition may contain 20% to 35% by weight of the finely comminuted rock wool or glass fibers together with 10% to 25% by weight of the pulverized hydrated Portland cement.

Pulverized hydrated Portland cement may likewise be used in conjunction with asbestos shorts or dust, and when so used augments the effectiveness of the asbestos in expanding the coating composition when subjected to flame. A convenient source of combined pulverized asbestos and pulverized hydrated Portland cement, is asbestos-cement roofing scrap. Asbestos cement roofing usually contains about 20% to 35% by weight of asbestos fiber and 65% to 80% by weight of hydrated Portland cement. Heretofore such scrap material has been regarded as an unavoidable waste of no commercial value. However, by subjecting the scrap to a disintegrator such as a hammer mill until it at least passes a 14 mesh testing sieve and until about 50% by weight passes a 48 mesh testing sieve a material is afforded which when incorporated e. g. to the extent of about 30% to 45% by weight in the bituminous coating affords a roofing having fire retardant properties in very high degree. The effectiveness of the asbestos cement scrap is due to the surface characteristics of the asbestos particles both because of the fibrous shape of the asbestos particles and because of the capacity of the asbestos to stabilize bitumen films in contact with the surface of the particles and is also due to the water of constitution contained in the asbestos and liberatable when the coating is subjected to flame temperatures. In addition the hydrated Portland cement not only contains water of constitution but also, like asbestos, has the capacity to stabilize films of bitumen in contact with the surface of the particles. Moreover, in disintegrated asbestos-cement scrap the indurated cement tends to adhere to the asbestos particles as nodules and this surface characteristic of the particles likewise assists in augmenting the flow resistance of the material and the tendency of the material to provide a stable and coherent skeletal mat when the coating is subjected to flame temperatures. It may also be mentioned that coating material containing asbestos-cement scrap has been found by us to be highly weather resistant.

Examples of finely divided heat resistant non-fibrous materials other than hydrated Portland cement which have the property of liberating gaseous material in the form of gases or vapors when subjected to flame temperatures are precipitated calcium silicate hydrate, precipitated magnesium silicate hydrate, and pulverized serpentine rock. Serpentine rock contains water of constitution in an amount corresponding to that contained in Chrysotile asbestos fiber. Of these materials hydrated Portland cement is regarded as preferable. Materials such as these should be used when reduced to a fineness of subdivision corresponding to that mentioned above in connection with hydrated Portland cement. Kaolin clay also tends to liberate water of constitution when subjected to flame temperatures. Another material falling in this category is dead burned calcium sulphate which tends to liberate $SO_3$ when subjected to flame temperatures.

A convenient test for determining the fire retardant properties of bituminous coating material for roofing and its behavior under flame exposure consists in directing a flame against an inclined specimen of bituminized felt carrying the coating material to be tested under precisely controlled conditions determined by the construction and operation of the testing apparatus. This test is suitable for testing materials without actually carrying out the tests prescribed by the Underwriters' Laboratories, Inc., which are on a much larger scale and involve much more labor and expense. The test while not a full substitute for the more elaborate tests prescribed by the Underwriters' Laboratories is capable of giving precise and reproducible results that are indicative of the fire retardant properties of the roofing that would be determinable under the Fire Underwriters' tests and this has been demonstrated in connection with roofing materials of the character described herein. The following is a description of the controlled conditions of the test, reference being made to Figs. 15 to 20 of the drawings:

Samples of material to be tested are made by applying bituminous coating material to an asphalt saturated felt base sheet so that the coating weighs 25 pounds ±2 pounds per 100 sq. ft. No granular material or the like is applied to the surface of the coating. The felt base sheet weighs about 30 pounds per 100 sq. ft. and is saturated to the extent of about 175% by weight with asphalt having a softening point of about 150° F. The bituminous coating material is applied by coating the felt in the machine direction of the sheet and the felt is applied to the test deck so that the machine direction of the sheet is parallel to the direction of flame travel.

The test is made in the wind tunnel 53 having a fan 54 at one end and a stack 55 at the other end. The tunnel is made of ¼ inch thickness asbestos-cement lumber and has two windows 56 and 57 therein which can be opened and closed by any suitable means (not shown).

Within the tunnel is the burner and testing deck which are located between two shields 58 and 58' of the asbestos-cement lumber spaced 12¼ inches apart, and which are rigidly mounted on a steel slab 43. The inclined test deck is indicated generally by the reference character 59 and comprises a lower iron frame-like member 60 having ¼ inch pegs 61 projecting from the face adjacent the upper and lower margins. Between the pegs strips 62 of combustible material 1¾ x 12 x ¼ inches are placed. This combustible material is what is known as Masonite Quarterboard and is selected instead of wood because it can be obtained with greater uniformity than can wood. Masonite Quarterboard is made from wood fiber by compression of the fiber of a fiberized mass in the presence of a binder until it has a density of about 36 pounds per cubic foot. The four center boards are dried at 180° F. in a steam oven for at least 7 days. Two full plies 12 x 12 inches of the roofing 69 to be tested and one-half ply 12 x 6 inches are placed on the combustible deck followed by an L-shaped guard plate 63 which guards the bottom edge of the roofing and of the Masonite. The assembly is held down by an iron frame 64 open at the bottom and held in place by thumb screws 65.

After the test deck has been assembled it is placed on the inclined support 66 which has an opening in the back underneath the combustible material 62 and which has side flanges 66' to protect each side of the test panel. The support 66 comprises a baffle 67 to prevent the flame from licking around behind the test deck. The support which is made of iron is mounted on the steel slab 43 which measures 12 x 40 x 1 inches. The parts for carrying the test deck are also made of iron. An iron bar 68, 12 x 1 x ¼ inches, is placed across the top edge of the deck to protect the combustible material at this point.

In front of the test deck is the burner 70 comprising a ¾ inch outside diameter standard gauge iron pipe with 17 holes 0.078 inch in diameter and ½ inch apart disposed at an angle that is parallel with the plane of the test deck. The burner has one inlet 71 controlled by valve 72 and another inlet 73 controlled by valve 74.

The dimensions of different parts of the testing apparatus shown on the drawings as used by us are as follows:

| | Inches | | Inches |
|---|---|---|---|
| a | 24 | o | 8 |
| b | 38 | p | 2 |
| b' | 6 | q | ¾ |
| c | 18½ | r | 1 |
| d | 72 | s | 12 |
| e | 16½ | t | 7 |
| f | 10 | u | 10½ |
| g | 12¼ | v | 12 |
| h | 38 | w | 12 |
| i | 64 | x | 1 |
| j | 32 | y | 12 |
| k | 24 | y' | 1 |
| l | 24 | z | 6 |
| m | 40 | aa | 12 |
| n | 27 | bb | 1 |

In carrying out the test the apparatus is first assembled and the burner is lighted, the valve 72 being opened and adjusted until a pilot flame is produced that is about ½ inch in length when the fan is operating. The windows 56 and 57 are then closed and the room in which the apparatus is placed is arranged so that there will be relative constant conditions during the test. The temperature and relative humidity of the room should be approximately 80° F. and 40%, respectively. The fan should generate a wind velocity of about 150–155 feet per minute at the portion of the deck exposed to the flame. The valve 75 is then opened until a flame about 8 to 9 inches long is produced having a temperature of about 1325–1370° F. When the valve 75 is opened to increase the flame a timing device is started.

During the test the upper surface of the test deck can be observed as well as the back composed of combustible Masonite strips. During the test the behavior of the coating material can be noted including possible exposure and combustion of the felt base sheet, the flowing of coating material down the roof deck, etc. When one or more of the Masonite strips of the test deck catch fire and begin to burn the test is concluded. If the Masonite merely carbonizes without breaking into flame the end point has not yet been reached.

In carrying out the test as above described the heat of the flame first softens the bituminous coating material and with ordinary roof coating materials used on prepared roofing products at present on the market the bituminous coating material including any filler disposed therein becomes displaced from the felt base sheet and flows down leaving the base sheet material substantially unprotected with the result that the organic felt material of the roofing in the test panel is consumed and the heat of the flame strikes through so that the combustible panel deck relatively soon becomes ignited. However, when the plies of the asphalt saturated felt base sheet material are coated with special coating composition according to this invention, the test samples behave in a manner corresponding generally with the behavior hereinabove described of roofing material embodying our invention when it is subjected to the Underwriters' Laboratories class "A" burning brand and flame exposure tests. The special coating material contains about 35% by weight of asbestos dust or the like, the balance being asphalt having a softening point of about 230° F. The finely divided asbestos dust or the like, instead of flowing down the inclined test panel when the bitumen in the coating material becomes heated and softened by the flame, resists the tendency to flow down the panel and provides a skeletal mat which remains in place as a coherent heat insulating mat-like mass in an amount adapted to effectively protect the underlying combustible test deck from the heat of the flame for a considerable period of time. Some of the bitumen in the coating may flow somewhat but most of it is retained in the skeletal mat which persists in place and resists displacement and remains as a protective covering. Eventually during the test the bitumen becomes hardened by carbonization and contributes to the coherence and toughness of the mat-like protective mass that remains. During the continuance of the test coating material having high fire retardant properties according to this invention continues to protect the combustible deck material from the heat of the flame so that the combustible deck does not ignite even under the very severe conditions of the test for prolonged periods of time, e. g. 40 minutes and upward of two hours or more. The resistance to flow of the finely divided asbestos dust or the like is due to the surface characteristics thereof which have been discussed more fully hereinabove and is such that a stable coherent skeletal mat is provided which affords heat insulation against the heat of the flame. A finely divided material having such surface characteristics as to be resistant to flow and provide a protective stable skeletal mat under the conditions of the test above described is regarded as "flow resistant" as this term is used herein.

The behavior of roofings embodying this invention may be contrasted with the behavior of the coating material used on ordinary roofings under the test conditions above mentioned. Ordinary asphalt impregnated roofing felt which weighs about 30 pounds per 100 sq. ft. and which is not protected by any waterproofing coating will prevent the combustible deck material from igniting for about 18 minutes. If the felt is coated with ordinary coating asphalt having a softening point of about 230° F., (the coating weighing for example about 25 pounds per 100 sq. ft.) the coating asphalt being itself combustible promotes the combustibility of the felt and the test can be run for only about 13 minutes without igniting the combustible deck. If ordinary filling material such as slate dust is included in the coating material (the coating composition containing for example about 35% of the slate dust) the combustible deck will ignite in about 17 minutes showing that the slate dust is wholly ineffective to afford fire retarding properties. Slate dust is specifically mentioned since slate dust is the filler most extensively used by the industry for the coating material used on bituminous roofings. Notwithstanding the presence of the slate dust the bituminous coating ignites readily and becomes displaced from the felt so that the roofing rapidly disintegrates and permits the combustible deck used in the test to become ignited after only the short period of time mentioned. Limestone dust when used as a filler behaves very similarly to the slate dust. Materials such as white lead, asbestine and pyrophyllite talc likewise have little effectiveness.

It is apparent from the results of the test above mentioned that according to the present invention one can readily double the fire resistance of ordinary roofings made at the present time and in preferred embodiments of this invention can increase the fire resistance of roofings many times more. Thus, for example, with a coating composition of the character above described comprising 35% of dry ground asbestos-cement roofing scrap the test was continued for over two hours without igniting the combustible deck panel used for the test.

It is not always essential that the filler used in the special coating composition be fibrous as well as finely divided in order to form a stable mat having flow resistance when the coating containing it is subjected to flame temperature. Thus pulverized hydrated Portland cement, precipitated calcium silicate hydrate, precipitated magnesium silicate hydrate, kaolin clay, dead burned calcium sulphate, and pulverized serpentine rock, especially when passing a 48 mesh sieve and retained on a 200 mesh sieve have some stabilizing effect and when used to the extent of about 30% or more by weight are flow resistant as defined hereinabove when the bituminous coatings containing these materials are subjected to flame temperatures. These materials are not as effective, however, as the finely divided fibrous materials in providing a skeletal mat that is coherent and resistant to flame temperatures when bituminous coating material is subjected to flame temperatures. The flow resistance of non-fibrous finely divided heat resistant materials such as those just mentioned is believed to be due primarily to the fact that they have the property of stabilizing films of bitumen in contact therewith. In any event the surface characteristics of such materials are such that there is an agglomerating action whereby a protective skeletal mat of considerable coherence and stability is provided when the coating material is subjected to flame temperatures.

Somewhat more generally the requirement that the coating material comprised by the new roofing provides a protective skeletal mat when the coating is subjected to flame temperatures is the result of surface characteristics of the small heat resistant particles contained in the coating material, i. e. the shape and size thereof and/or interfacial action between the particles and the bitumen which stabilizes bitumen films in contact with the surface of the particles. Any finely divided heat resistant material, the particles of which have such surface characteristics as to be flow resistant, may be used. By "heat resistant" any material which is sufficiently heat resistant that it will retain structural integrity when subjected to flame temperature while incorporated in a roofing is intended. In this connection asbestos fiber, hydrated Portland cement, picrolite, etc., are regarded as heat resistant even though they contain water of constitution which may be driven off at temperatures adjacent flame temperatures.

Certain of the finely divided heat resistant materials which have the surface characteristics mentioned above not only are of utility according to this invention in imparting fire resistance to roofing material and roof coverings but also have the added advantage of increasing the blister resistance of bituminous coating materials in which they are incorporated. Examples of such materials are asbestos, asbestos-cement mixtures (e. g. asbestos cement scrap), hydrated Portland cement, kaolin clay, calcium silicate hydrate, picrolite, and serpentine. Certain other materials of those finely divided materials having the surface characteristics mentioned while they do not have the capacity of increasing blister resistance to material degree are of utility in increasing the fire resistance of roofing according to this invention. Examples of such finely divided materials are mineral wool, glass fiber, and dead burned calcium sulphate. The materials which afford both fire resistance and blister resistance preferably constitute the entire filler although the advantages thereof may be obtained to some degree when they constitute a major proportion of the filler. The term mineral wool includes fibrous products obtained by attenuating into fibrous form suitable fused mineral materials such as rock and slag. Those finely divided heat resistant materials which are regarded as preferable from the standpoint of effectiveness in increasing the fire resistance of roofing and which preferably constitute at least a major proportion of the total finely divided material having the surface characteristics above mentioned are asbestos, mineral wool, glass fiber, asbestos-cement, hydrated Portland cement, serpentine, and picrolite. Materials such as asbestos, e. g. Chrysotile asbestos and picrolite are referred to as asbestoform mineral fiber. Moreover, of the suitable finely divided heat resistant materials it is preferable to employ fibrous mineral material of the character above referred to, e. g., finely divided asbestos, mineral wool, glass wool, etc., as at least about 20% of the finely divided heat resistant material which is contained in the coating material and which has the surface characteristics above mentioned.

In addition to the capacity of the coating material to provide a skeletal mat which remains in place when the coating is subjected to flame temperatures, the skeletal mat must have a definite heat insulating capacity. In the foregoing example of a roofing comprising three thicknesses of preformed shingle material, each thickness of the preformed shingle material carried about 40 pounds per 100 sq. ft. of coating material containing at least about 35% by weight of asbestos dust. The coating for each thickness therefore contained at least about 14 pounds per 100 sq. ft. of the asbestos dust and the roof covering as a whole contained at least about 42 pounds per 100 sq. ft. of roof deck covered thereby.

The finely divided heat resistant material used in the special coating material may be disposed in three layers as shown in Figs. 5, 6 and 7 or in two layers as shown in Fig. 9. Other arrangements are also possible. Thus instead of applying the special coating to both sides of a foundation sheet it may be applied only to one side. Preferably, however, the bituminous backing coating 15 of the roofing material shown in Fig. 4 may be composed of the special coating material according to this invention. The individual coating or coatings applied to the foundation sheet may likewise be varied in thickness. For example, one thick layer of the special coating composition might be used to replace two thinner layers in a roof deck covering with attainment of comparable results although disposition of the special coating material in a plurality of strata is regarded as preferable from the standpoint of effectiveness. By varying the number, thickness and composition of the layers of special coating composition, varying degrees of fire retardant effectiveness can be attained. As aforesaid in preferred embodiments of this invention, roof deck coverings can be made which are so highly fire retardant as to pass the class "A" fire retardant tests of the Underwriters' Laboratories, Inc.

In order to obtain especially high fire resistance in preferred embodiments of this invention, it is preferable that substantially all of the bituminous coating material comprised in prepared roofing materials or in roof coverings as a coating or layer of substantial thickness covering the sheet material be the special bituminous coating material herein described.

Somewhat more generally the special coating composition ordinarily is adherently applied to a foundation sheet material so that the weather side coating layer weighs about 20 to 60 pounds per 100 sq. ft. although about 25 to 50 pounds per 100 sq. ft. is usually preferable. Moreover, the coating material should contain at least about 30% by weight and preferably at least about 35% by weight of the finely divided heat resistant material in order to afford a skeletal mat of desired thickness and density when the coating is subjected to flame temperatures. For high resistance to flame spread at least about 35% of the finely divided heat resistant material should be included in the special coating composition. In the coating as applied the finely divided heat resistant material should weigh at least about 6 pounds per 100 sq. ft. and preferably at least about 9 pounds per 100 sq. ft. so as to afford a skeletal mat having substantial body, thickness, coherence and effective heat insulating capacity. In the complete roof deck covering as applied comprising a foundation sheet and one or more layers of the special coating for high fire resistance the roofing should preferably contain at least about 27 pounds per 100 sq. ft. of the finely divided heat resistant material and at least about 15 pounds per 100 sq. ft. of finely divided heat resistant material is desirable. As aforesaid the special coating material is preferably disposed in a plurality of layers separated by felt or other sheet material, each layer, however, containing sufficient of the finely divided heat resistant material to provide a coherent mat of substantial thickness when the coating material is subjected to flame temperatures.

In the roofing structures described the fire resistance is due to the effectiveness of the individual layers of special coating composition and also to the disposition of the layers in strata in the roofing structure whereby the brunt of the heat of the flame is borne by the outermost layer of coating composition and underlying layers serve not only to resist the heat of the flame but also to afford a thermal insulating mat material that prevents the heat of the flame from striking through to the supporting roof deck. While this invention thus relates to the complete roof deck covering considered as a whole, features of this invention relate to preformed roofing material comprising a base sheet of felt or the like carrying a coating (or coatings) of the special coating composition adherent thereto inasmuch as even a single layer of such roofing material has much greater fire resistance than similar products heretofore manufactured.

With regard to the bitumen that is used in the special coating it is preferable that it have a relatively high softening point so as to give it certain initial stability even though at flame temperatures any bitumen that can be liquified sufficiently by heat to apply it by coating operation becomes highly liquid and would flow excessively at such temperatures were it not for the skeletal mat-like structure that is comprised therein. Use of soft oily bitumens having a softening point below about 160° F. is not recommended. Those having a softening point of about 200° F. to about 240° F. are preferred inasmuch as the resulting roof has optimum properties of pliability, stability and weathering life. When such bitumens are used the filler added usually raises the softening point to above about 270° F. and preferably above about 300° F. It is usually not desirable to use a composition having a softening point above about 350° F. as such compositions are difficult to apply and are likely to be excessively stiff and brittle at low temperatures. While bitumen having a softening point of about 200° F. to 240° F. is preferred, bitumens of higher softening point may be employed but usually this results in a roofing that is more brittle at normal and below normal temperatures. In addition to asphalts derived from Mid-Continent crudes, asphalts from Mexican, Venezuelan and Colombian crudes are also suitable. Moreover other bitumens such as pitches, coal tar and the like may also be used in the practice of this invention.

It is not necessary in the practice of this invention that the special coating composition be preformed at the factory integral with a foundation sheet composed of bituminized felt or the like inasmuch as the roofing can be fabricated on the job. An example of this type of roofing is shown in Figs. 10 and 11 which illustrate a typical "built up" roofing. The roofing is shown installed on wood sheathing 23 to which is secured as by suitable nails 25 a single thickness of building paper 24 such as red rosin dry sheet. Two thicknesses of bitumen impregnated felt 26 are secured overlying the building paper by nails 45. A layer of bituminous waterproofing 27 is then applied by mopping it on while in a heat liquified condition but instead of using ordinary mopping asphalt a special coating composition, e. g. containing about 30% of asbestos dust as described hereinabove, is used and in each layer the mopping asphalt weighs about 25 to 40 pounds per 100 sq. ft. In applying the special waterproofing it should be applied while heated to about 450° F., i. e., at a somewhat higher temperature than the temperature employed in applying ordinary mopping asphalt and to keep the composition uniform an agitator is preferably used in the heater. A layer 28 of bitumen impregnated felt is next deposited on the waterproofing 27 while it is still adhesive. Another layer 29 of the special waterproofing is then installed followed by a top layer 30 of bitumen impregnated felt and a top layer 31 of the special waterproofing composition. Mineral granules 32 may be disposed over the surface of the layer while it is still adhesive and caused to be embedded in the surface.

A built up roof of the character above mentioned will be found to be very fire resistant and when subjected to fire behaves in the manner above described to protect the underlying roof deck from the heat of the flame. A built up roofing of similar construction but not utilizing the special coating composition according to this invention will only pass a class "C" test whereas the roofing above described will pass a class "A" test. In order to increase the fire resistance of built up roofings it has heretofore been the practice to place large amounts of mineral on the roof surface, i. e. as much as about 300 to 400 pounds of roofing gravel or crushed slag per 100 sq. ft. of roofing area. It has also been proposed to employ heavy asbestos felt in the fabrication of the roofing. According to the present invention high fire resistance is achieved without resort to such expedients and using considerably less felt in the roofing as a whole.

A modified form of built up roofing is illustrated in Figs. 12, 13 and 14. The roofing is shown installed on wood sheathing 33 over which is secured a single layer of building paper 34. Overlying the building paper 34 is a layer 35 of bitumen impregnated felt which instead of being uncoated as in the embodiment shown in Figs. 10 and 11 may comprise a felt base 35a and a coating 35b (see Fig. 14) the coating being preformed at the factory and composed of the special coating composition. In order to secure the next layer 36 of bitumen impregnated felt (which may be precoated like layer 35) in place a suitable mopping asphalt layer 37 may be employed. The mopping asphalt may be a light application of ordinary mopping asphalt inasmuch as the fire resistance is afforded by the special coating composition that is preformed with the felt sheets 35 and 36. However, it is preferable that the adhesive waterproofing that is applied by mopping be composed of the special composition hereinabove described so as to afford maximum fire resistance. In a similar way by a waterproof adhesive layer 38 the cap sheet 39 is bonded in place. The cap sheet comprises a coating 41 of the special coating composition preformed therewith to which are adherent mineral granules 40, the cross section of the cap sheet being similar to the section shown in Fig. 4 except that the back coating layer 15 is ordinarily omitted. This type of built up roofing likewise may be made so as to have extraordinarily high fire resistance.

While the felt sheet material has been mentioned hereinabove as the strain resisting element of roofing and roofing structures embodying this invention, it is apparent that any other suitable sheet material, fibrous or non-fibrous, either foraminous or non-foraminous, adapted to afford desired strength characteristics may be used. Ordinary roofing felt made of organic fibers is, however, the most inexpensive foundation sheet material, and according to this invention notwithstanding the combustibility of such sheet material roofing comprising it can be made highly fire resistant. If desired non-combustible fibers can be incorporated in the felt to augment the fire resistance of the roofing.

While the special coating material is effective when applied to sheet material by an ordinary coating operation wherein the coating material is merely applied to the surface of the sheet material and is spread to desired thickness there are distinct advantages in applying the special coating material utilizing the method and apparatus of our Patents Nos. 2,105,531 and 2,159,587. By so doing one can obtain the highly blister resistant roofing material of low void content covered by our patent 2,159,586. In addition by compressing bitumen impregnated fibrous sheet material and permitting it to expand while in contact with the special coating material herein described comprising finely divided heat resistant material having surface characteristics such that it is flow resistant when the coating material is exposed to flame temperature, the finely divided material becomes keyed into the interstices in the fibrous sheet material adjacent the surface of the sheet material so that the capacity of the finely divided heat resistant material to resist flowing and displacement when the coating material containing it is exposed to flame temperature is materially augmented and so that a skeletal mat that is especially stable and coherent is produced. Moreover, the bitumen in the bitumen impregnated fibrous sheet material adjacent the surface thereof is replaced by a layer of the special bituminous coating material, thereby reducing the amount of bitumen that is contained in the fibrous sheet material which can bleed out and become ignited when the roofing is exposed to flame.

While this invention has been described in connection with certain illustrative embodiments of this invention it is to be understood that this has been done for purposes of exemplification. Accordingly the scope of this invention is to be governed by the language of the following claims construed in the light of the foregoing description of our invention.

We claim:

1. A roof covering having high resistance to fire comprising fibrous sheet material and thermoplastic bituminous coating material coating said sheet material, said coating material containing bitumen having a softening point above 160° F. and of the range 45% to 70% by weight of the coating material, and said coating material containing uniformly distributed therein and over said sheet material finely-divided solid water-insoluble heat-resistant mineral filler of the range 30% to 55% by weight of the coating material, at least 30% by weight of said coating material consisting of said finely-divided solid water-insoluble heat-resistant mineral filler which passes a 14-mesh testing sieve and over 50% by weight of which is retained on a 200-mesh testing sieve and which constitutes at least 15 pounds per 100 square feet of said roof covering and which has a flow resistance value of at least 40 minutes when a bituminous composition consisting of 65% by weight of coating asphalt having a softening point of 230° F. and 35% by weight of said filler is subjected to flame temperature under the flow resistance test as defined herein, said coating material when heat plasticized being spreadable to form a layer of uniform thickness and uniform consistency.

2. A roof covering according to claim 1 wherein more than 50% by weight of said finely-divided water-insoluble solid heat-resistant mineral filler which passes a 14-mesh testing sieve and over 50% by weight of which is retained on a 200-mesh testing sieve and which constitutes at least 15 pounds per 100 square feet of said roof covering and which has a flow resistance value of at least 40 minutes when a bituminous composition consisting of 65% by weight of coating asphalt having a softening point of 230° F. and 35% by weight of said filler is subjected to flame temperature under the flow resistance test as defined herein, is asbestoform mineral fiber.

3. A roof covering according to claim 1 wherein more than 50% by weight of said finely-divided water-insoluble solid heat-resistant mineral filler which passes a 14-mesh testing sieve and over 50% by weight of which is retained on a 200-mesh testing sieve and which constitutes at least 15 pounds per 100 square feet of said roof covering and which has a flow resistance value of at least 40 minutes when a bituminous composition consisting of 65% by weight of coating asphalt having a softening point of 230° F. and 35% by weight of said filler is subjected to flame temperature under the flow resistance test as defined herein, is asbestos-cement.

4. A roof covering according to claim 1 wherein more than 50% by weight of said finely-divided water-insoluble solid heat-resistant mineral filler which passes a 14-mesh testing sieve and over 50% by weight of which is retained on a 200-mesh testing sieve and which constitutes at least 15 pounds per 100 square feet of said roof covering and which has a flow resistance value of at least 40 minutes when a bituminous composition consisting of 65% by weight of coating asphalt having a softening point of 230° F. and 35% by weight of said filler is subjected to flame temperature under the flow resistance test as defined herein, is hydrated Portland cement.

5. A roof-covering according to claim 1 wherein said finely-divided solid water-insoluble heat-resistant filler contained in said coating material includes mineral filler that contains at least about 12% by weight of water of constitution liberatable when said coating material is subjected to flame temperature.

6. A highly fire-resistant prepared bituminous roofing material comprising a fibrous sheet material impregnated with an asphaltic saturant and a waterproofing coating of thermoplastic asphaltic coating material coating said sheet material, said coating material containing asphaltic bitumen having a softening point above about 160° F. and of the range 45% to 70% by weight of the coating material, and said coating material containing uniformly-distributed therein and over said sheet material finely-divided solid water-insoluble heat-resistant mineral filler of the range 30% to 55% by weight of the coating material, at least 30% by weight of said coating material consisting of said finely-divided solid water-insoluble heat-resistant mineral filler which passes a 14-mesh testing sieve and over 50% by weight of which is retained on a 200-mesh testing sieve and which has a flow resistance value of at least 40 minutes when a bituminous composition consisting of 65% by weight of coating asphalt having a softening point of 230° F. and 35% by weight of said filler is subjected to flame temperature under the flow resistance test as defined herein, said coating material when heat plasticized being spreadable to form a layer of uniform thickness and uniform consistency, said coating material being applied at the rate of at least 20 pounds per 100 square feet of the roofing material, and said roofing material being pliable at 77° F.

7. A roofing material according to claim 6 wherein at least 20% by weight of said finely-divided water-insoluble solid heat-resistant mineral filler which passes a 14-mesh testing sieve and over 50% by weight of which is retained on a 200-mesh testing sieve and which has a flow resistance value of at least 40 minutes when a bituminous composition consisting of 65% by weight of coating asphalt having a softening point of 230° F. and 35% by weight of said filler is subjected to flame temperature under the flow resistance test as defined herein, is mineral fiber.

8. A roof covering having high resistance to fire comprising a plurality of sheets of fibrous sheet material impregnated with an asphaltic bitumen and thermoplastic bituminous coating material disposed in a plurality of layers and adherently coating said sheet material, said coating material containing asphaltic bitumen having a softening point above 160° F. and of the range 45% to 70% by weight of the coating material, and said coating material containing uniformly distributed therein finely divided solid water-insoluble heat-resistant mineral filler of the range 30% to 55% by weight of the coating material, at least 30% by weight of said coating material consisting of said finely-divided solid water-insoluble heat-resistant mineral filler which passes a 14-mesh testing sieve and over 50% by weight of which is retained on a 200-mesh testing sieve and which has a flow resistance value of at least 40 minutes when a bituminous composition consisting of 65% by weight of coating asphalt having a softening point of 230° F. and 35% by weight of said filler is subjected to flame temperature under the flow resistance test as defined herein and which constitutes at least about 15 pounds per 100 square feet of said roof covering with at least about 6 pounds per 100 square feet contained in each of at least two of said layers of coating material, said coating material when heat plasticized being spreadable to form a layer of uniform consistency and uniform thickness.

9. A roof covering according to claim 8 wherein one of said layers of thermoplastic bituminous coating material is on the weather side of said roof covering and is applied at the rate of at least 20 pounds per 100 square feet and wherein said finely-divided solid water-insoluble heat-resistant mineral filler which passes a 14-mesh testing sieve and over 50% by weight of which is retained on a 200-mesh testing sieve and which has a flow resistance value of at least 40 minutes when a bituminous composition consisting of 65% by weight of coating asphalt having a softening point of 230° F. and 35% by weight of said filler is subjected to flame temperature under the flow resistance test as defined herein constitutes at least 27 pounds per 100 square feet of said roof covering with at least about 9 pounds per 100 square feet contained in each of at least two of said layers.

10. A roof covering according to claim 8 wherein one of said layers of thermoplastic bituminous coating material is on the weather side of said roof covering and is applied at the rate of at least 20 pounds per 100 square feet and wherein said finely-divided solid water-insoluble heat-resistant mineral filler which passes a 14-mesh testing sieve and which has a flow resistance value of at least 40 minutes when a bituminous composition consisting of 65% by weight of coating asphalt having a softening point of 230° F. and 35% by weight of said filler is subjected to flame temperature under the flow resistance test as defined herein constitutes at least 42 pounds per 100 square feet of said roof covering with at least 14 pounds per 100 square feet contained in each of at least three of said layers.

11. A roofing having high resistance to fire comprising fibrous sheet material and thermoplastic bituminous coating material coating said sheet material, said coating material containing bitumen having a softening point of at least about 200° F. and of the range 45% to 70% by weight of the coating material, and said coating material containing finely-divided solid heat-resistant filler of the range 30% to 55% by weight of the coating material, at least 30% by weight of said coating material consisting of finely-divided heat-resistant mineral fiber which passes a 14-mesh testing sieve and over 50% by weight of which is retained on a 200-mesh testing sieve and which constitutes at least about 15 pounds per 100 square feet of the roof covering, said coating material when heat plasticized being spreadable to form a layer of uniform consistency and uniform thickness.

12. A roof covering having high resistance to fire comprising fibrous sheet material and thermoplastic bituminous coating material coating said sheet material, said coating material containing bitumen having a softening point above 160° F. and of the range 45% to 70% by weight of the coating material, and said coating material containing uniformly distributed therein and over said sheet material finely-divided solid heat-resistant material of the range 30% to 55% by weight of the coating material, at least 30% by weight of said coating material consisting of said finely-divided solid heat-resistant material which passes a 14-mesh testing sieve and over 50% by weight of which is retained on a 200-mesh testing sieve and which constitutes at least 15 pounds per 100 square feet of said roof covering and which is selected from the group consisting of asbestoform mineral fiber, asbestos-cement, hydrated Portland cement, kaolin clay, calcium silicate hydrate, mineral wool, glass wool, dead burned calcium sulphate, serpentine rock and mixtures of any of said materials in said group, said coating material when heat plasticized being spreadable to form a layer of uniform thickness and uniform consistency.

13. A fire-resistant prepared roofing material which comprises fibrous sheet material impregnated with an asphaltic saturant and carrying a waterproofing coating of asphaltic coating material, said coating material containing asphaltic bitumen having a softening point above about 160° F. and of the range 45% to 70% by weight of the coating material, and said coating material containing uniformly distributed therein as a filler finely-divided solid heat-resistant material of the range 30% to 55% by weight of said coating material, at least 30% by weight of said coating material consisting of said finely-divided solid heat-resistant material which passes a 14-mesh testing sieve and over 50% by weight of which is retained on a 200-mesh testing sieve and which is selected from the group consisting of asbestoform mineral fiber, asbestos-cement, hydrated Portland cement, kaolin clay, calcium silicate hydrate, mineral wool, glass wool, dead burned calcium sulphate, serpentine rock and mixtures of any of said materials in said group, said coating material when heat plasticized being spreadable to form a layer of uniform thickness and uniform consistency, said coating material being applied at the rate of at least 20 pounds per 100 square feet of the roofing material, and said roofing material being pliable at 77° F.

14. A roof covering having high resistance to fire and to blistering comprising fibrous sheet material and thermoplastic bituminous coating material coating said sheet material, said coating material containing bitumen having a softening point above 200° F. and of the range 45% to 70% by weight of the coating material, and said coating material containing uniformly distributed therein and over said sheet material finely-divided solid heat-resistant material of the range 30% to 55% by weight of the coating material, at least 30% by weight of said coating material consisting of said finely-divided solid heat-resistant material which passes a 14-mesh testing sieve and over 50% by weight of which is retained on a 200-mesh testing sieve and which constitutes at least 15 pounds per 100 square feet of said roof covering and which is selected from the group consisting of asbestoform mineral fiber, asbestos-cement, hydrated Portland cement, serpentine rock, calcium silicate hydrate and mixtures of any of said materials in said group, said coating material having a softening point not less than 300° F. and not substantially greater than 350° F. and the filler content of said coating material containing less than about 10% by weight of particles retained on a 10-mesh testing sieve.

15. A prepared roofing material highly resistant to fire and to blistering which comprises fibrous sheet material and bituminous coating material coating said sheet material, said coating material containing bitumen having a softening point above about 200° F. and of the range 45% to 70% by weight of the coating material, and said coating material containing uniformly distributed therein as a filler, finely-divided solid heat-resistant material of the range 30% to 55% by weight of the coating material, at least 30% by weight of said coating material consisting of said finely-divided solid heat-resistant material which passes a 14-mesh testing sieve and over 50% by weight of which is retained on a 200-mesh testing sieve and which is selected from the group consisting of asbestoform mineral fiber, asbestos-cement, hydrated Portland cement, serpentine rock, calcium silicate hydrate and mixtures of any of said materials in said group, said coating material having a softening point above 300° F. and when heat plasticized being spreadable to form a layer of uniform thickness and uniform consistency and being applied at the rate of at least 20 pounds per 100 square feet of the roofing material, and said roofing material being pliable at 77° F.

16. A roofing having high resistance to fire and to blistering comprising fibrous sheet material and thermoplastic bituminous coating material coating said sheet material, said coating material containing bitumen having a softening point of at least about 200° F. and of the range 45% to 70% by weight of the coating material, and said coating material containing finely-divided solid heat-resistant filler of the range 30% to 55% by weight of the coating material, at least 30% by weight of said coating material consisting of asbestoform mineral fiber which passes a 14-mesh testing sieve and over 50% by weight of which is retained on a 200-mesh testing sieve, said coating material having a softening point above 300° F. and when heat-plasticized being spreadable to form a layer of uniform thickness and uniform consistency.

17. A roofing according to claim 16 wherein at least about 30% by weight of said coating material consists of Chrysotile asbestos fiber which passes a 14-mesh testing sieve, at least about 50% by weight of which passes a 48-mesh testing sieve, at least about 35% by weight of which passes a 100-mesh testing sieve and over 50% by weight of which is retained on a 200 mesh testing sieve.

18. A roofing having high resistance to fire and to blistering comprising fibrous sheet material and thermoplastic bituminous coating material coating said sheet material, said coating material containing bitumen having a softening point of at least about 200° F. and of the range 45% to 70% by weight of the coating material, and said coating material containing finely-divided solid heat-resistant filler of the range 30% to 55% by weight of the coating material, at least 30% by weight of said coating material consisting of asbestos-cement which passes a 14-mesh testing sieve and over 50% by weight of which is retained on a 200-mesh testing sieve, said coating material having a softening point above 300° F. and when heat-plasticized being spreadable to form a layer of uniform thickness and uniform consistency.

19. A roofing having high resistance to fire and to blistering comprising fibrous sheet material and thermoplastic bituminous coating material coating said sheet material, said coating material containing bitumen having a softening point of at least about 200° F. and of the range 45% to 70% by weight of the coating material, and said coating material containing finely-divided solid heat-resistant filler of the range 30% to 55% by weight of the coating material, at least 30% by weight of said coating material consisting of hydrated Portland cement which passes a 14-mesh testing sieve and over 50% by weight of which is retained on a 200-mesh testing sieve, said coating material having a softening point above 300° F. and when heat-plasticized being spreadable to form a layer of uniform thickness and uniform consistency.

GEORGE ARTHUR FASOLD.
HAROLD W. GREIDER.

CERTIFICATE OF CORRECTION.

Patent No. 2,326,723. August 10, 1943.

GEORGE ARTHUR FASOLD, ET AL.

It is hereby certified that error appears in the printed specification of the above numbered patent requiring correction as follows: Page 1, first column, line 8, for "singles" read --shingles--; line 55, for "or" after "cost" read --of--; page 3, second column, line 27-28, for "Preferebly" read --Preferably--; page 5, second column, line 52, for "absetos" read --asbestos--; page 6, first column, line 4, for "the" before "asbestos" read --fine--; page 7, first column, line 16, for "nut-like" read --mat-like--; page 8, first column, line 31, after "when" insert --of--; page 13, second column, line 39, for "filter" read --filler--; page 14, second column, line 15, claim 10, after "sieve" insert the words --and over 50% by weight of which is retained on a 200-mesh testing sieve--; and that the said Letters Patent should be read with this correction therein that the same may conform to the record of the case in the Patent Office.

Signed and sealed this 12th day of October, A. D. 1943.

(Seal)

Henry Van Arsdale,
Acting Commissioner of Patents.